INVENTORS
REGINALD D. NORTHCOTE
CEDRIC R. JONES

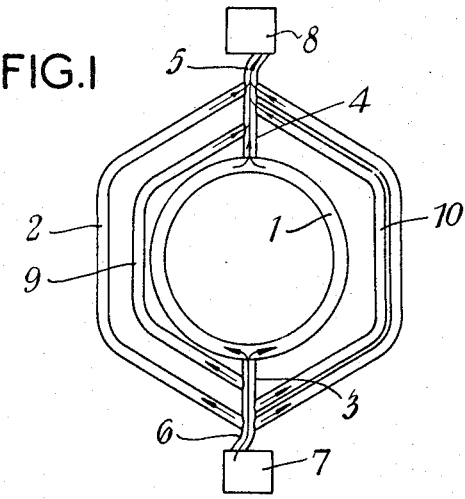
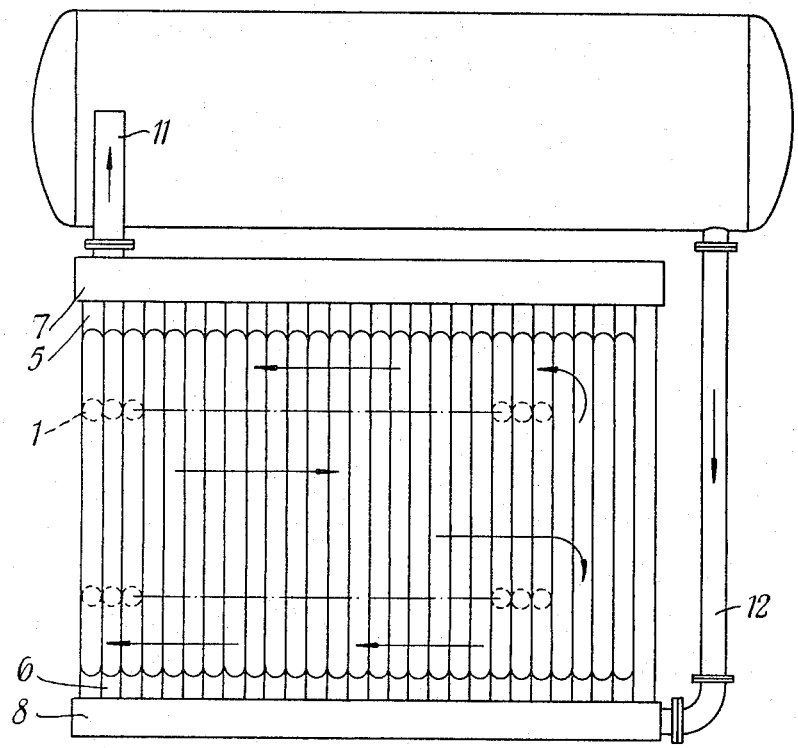

May 14, 1968  R. D. NORTHCOTE ET AL  3,382,848
BOILERS

Filed Aug. 29, 1966  3 Sheets-Sheet 3

INVENTORS
REGINALD D. NORTHCOTE
CEDRIC R. JONES

United States Patent Office 3,382,848
Patented May 14, 1968

3,382,848
BOILERS
Reginald Dennis Northcote and Cedric Richard Jones, Dudley, England, assignors to G.W.B. Boilers Limited, Dudley, England
Filed Aug. 29, 1966, Ser. No. 575,804
8 Claims. (Cl. 122—235)

ABSTRACT OF THE DISCLOSURE

A plurality of water tube units are positioned in closely spaced relationship by inlet and outlet headers so that the units present a hot gas inflow path and a hot gas return path exposing the whole of both the interior and exterior surfaces of an inner set of tubular rings to the hot gas.

---

It is an object of the invention to provide boilers of high thermal efficiency which can be built up in various sizes from standardised tubular units in conjunction with burners, grates, normal auxiliaries and drums.

According to the invention from one aspect we provide a boiler which includes a water wall flow path for combustion gases comprised by an inner cylindrical passage made up from a plurality of closely spaced tubular rings and a surrounding annular passage for return flow of gases defined between the said rings and a plurality of closely spaced rings of greater diameter, both sets of rings being connected to lower and upper headers for liquid inlet and liquid or vapour outlet.

The terms "cylindrical" and "ring" as used herein are intended to cover shapes other than truly circular and in particular to cover polygonal shapes and what may be termed open rings in that the circle or polygon need not be closed.

By closely spaced is meant actually touching or so nearly touching as to leave a narrow gap between adjacent tubes.

From another aspect, the invention provides a water-tube unit adapted for assembly with similar units to form the gas flow path of a boiler comprising an inner ring of tubing and at least one surrounding outer ring of tubing, each connected at lower and upper points to inlet and outlet tubes adapted for connection to inlet and outlet headers of the boiler respectively, the inner ring being connected to these tubes at points inwardly of the points to which the outer ring is connected whereby the resistance to fluid flow through the inner ring is less than that through the outer ring.

From yet another aspect, a boiler according to the invention includes a water wall flow path for combustion gases made up of a plurality of closely spaced units, each of which is formed of tubing arranged to provide an inner ring and a surrounding outer ring connected at lower and upper points to inlet and outlet tubes, the inner ring providing a path of less resistance to fluid flow than that provided by the outer ring, the inlet and outlet tubes of all the sections being connected to inlet and outlet headers respectively, the inner rings of the assembled sections defining a passage for the hottest gases and the inner and outer rings of the assembled sections defining between them a return path for the gases.

According to a further feature of the invention, the water tube units include one or more intermediate tubes between the inner and outer rings, and the units are arranged so that in the assembled water wall flow path for gases these intermediate tubes are offset from one another in adjacent sections. The intermediate tubes of each unit may be asymmetrically arranged and alternate units reversedly arranged in the assembled flow path so as to offset the intermediate tubes from one another. Alternatively, two types of units with intermediate tubes may be provided, these units being assembled so that the intermediate tubes in adjacent sections are offset from one another. A section of the flow path for this purpose may comprise one or more units.

The units in the assembled boiler may all be connected to the same inlet and outlet headers or individual units may be connected to different inlet and outlet headers which may be arranged parallel to one another.

Where a boiler is required for steam raising or, in some situations, water heating, it may be desirable to connect the headers to a drum and, in some cases, the water wall gas flow path may be caused to circumscribe a proportion or all of the drum periphery and could, in fact, partly or wholly pass through the drum by means of tubes inserted for this purpose.

Where the combustion gases circumscribe the drum periphery (possibly having first passed through the drum) the water-wall may be constituted by tubes which connect directly to the drum at higher and lower positions or may include one or more series of tubes connected between upper and lower arcuate or curved header tubes which are themselves connected to the drum through radial tubes at upper and lower levels.

The thermal circulation of water within the drum may be assisted in known manner by the incorporation of baffles of suitable shape whose action is to direct water flow wherever required.

Further baffles may also be provided in boilers for steam generation, to assist in preventing water carry over into the steam outlet.

Arrangements may be made to operate the boiler with the drum flooded for water heating or alternatively with a lower level for certain water heating applications and for steam raising. For high pressure work the tubes of the water-wall sections may be of heavy gauge steel and the drum wall may also be thicker than that used for low pressure work.

The above and other features of the invention are incorporated in one or other of preferred constructional forms, which will now be described as examples with reference to the accompanying drawings in which:

FIG. 1 is an elevation of a water tube unit used as an element in various types of boilers.

FIG. 3 is a similar view of a boiler incorporating a horizontal drum.

Figure 2:
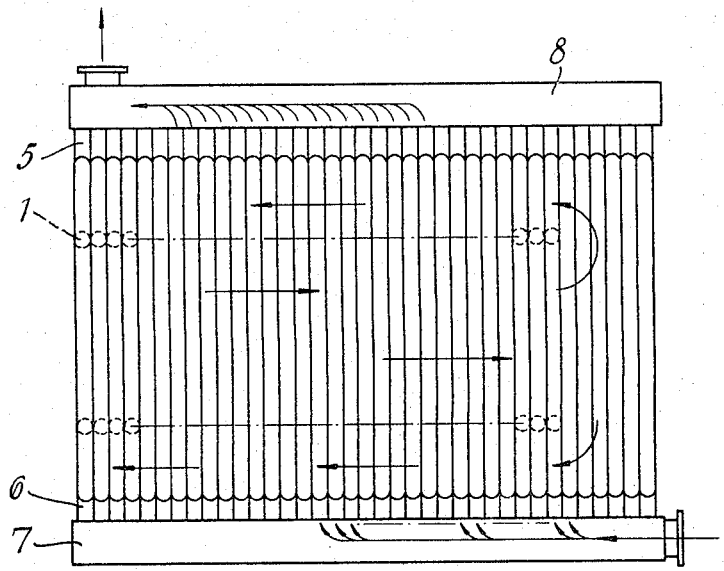
FIG. 2 is a diagrammatic side elevation of one form of hot water boiler.

In the first form, primarily suitable for hot water heating purposes, no drum is used in the boiler construction.

In this form, a unit as shown in FIG. 1 forming a section of a water tube boiler is made from tubing and comprises a circular inner ring 1 and an outer hexagonal ring 2, the outer ring being coaxial with the inner ring and arranged with two opposite corners on a diametral line of the inner ring. The two rings are connected by two tubes 3 and 4 extending outwardly from opposite ends of this diameter and connected to the outer ring at the two aforesaid corners. These tubes form inlet and outlet connections to the rings and are extended at 5 and 6 for connection to inlet and outlet headers 7 and 8 respectively.

Between the inner and outer rings are intermediate tubes 9 and 10, one on each side of the said diametral line. Each tube is a semi-hexagon and is arranged parallel to the outer ring. The tube 9 on one side is connected to the inlet and outlet tubes adjacent the inner ring and the tube 10 on the other side is connected to the inlet and outlet tubes adjacent the outer ring so that the two intermediate tubes are offset relatively to one another.

The unit is flat, that is the centre lines of all the tubes lie in one plane.

As shown in FIG. 2 a number of such units are assembled in closely spaced relation with the inner rings 1 of adjacent units almost touching one another and defining an inner cylindrical gas flow path for the boiler. Alternate units are reversed in relation to one another so that the intermediate tubes 9 and 10 are staggered along the boiler. The outer rings 2 form together an outer wall for the boiler.

The assembly of tubes is enclosed in a casing arranged so that the flow of combustion gases is down the centre of the inner chamber from one end to the other and then reversed to pass over the staggered intermediate tubes to an exhaust flue (not shown).

In this form, the inlet and outlet headers are symmetrically arranged on either side of the units, the inlet header 7 being at the bottom and outlet header 8 at the top.

In some cases it may be desirable to use a drum to augment water volume or to provide additional steam space.

Figure 4:
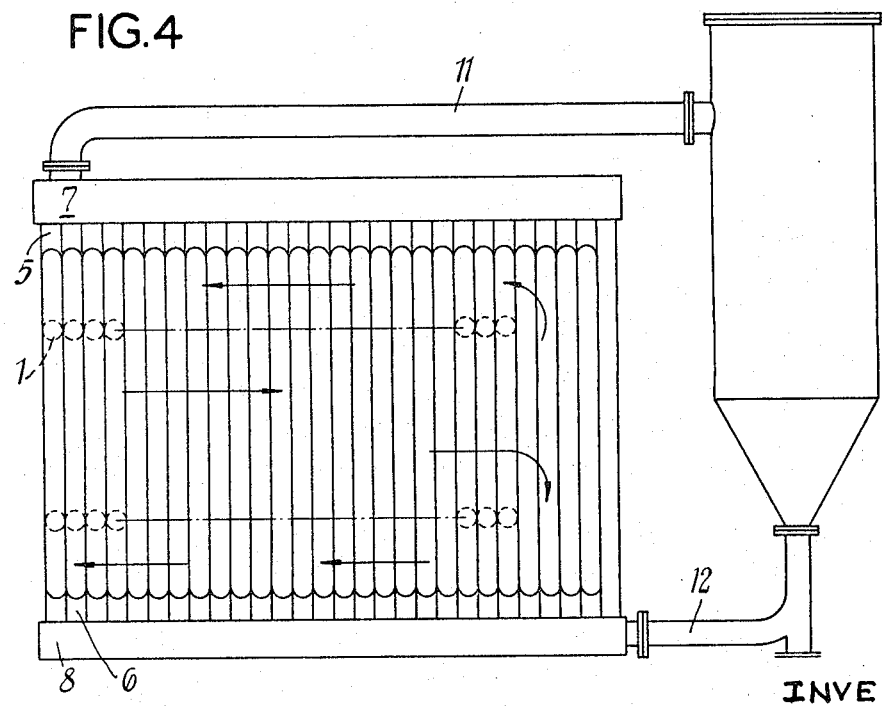
FIG. 4 is a similar view of a boiler incorporating a vertical drum.

Such a drum may be horizontal or vertical as shown in FIGS. 3 and 4, but in either case a connection 11 is taken from the outlet header 7 of the water wall section to a level in the shell above a return flow connection 12 to the inlet header 8 of the water wall section.

Figure 5:
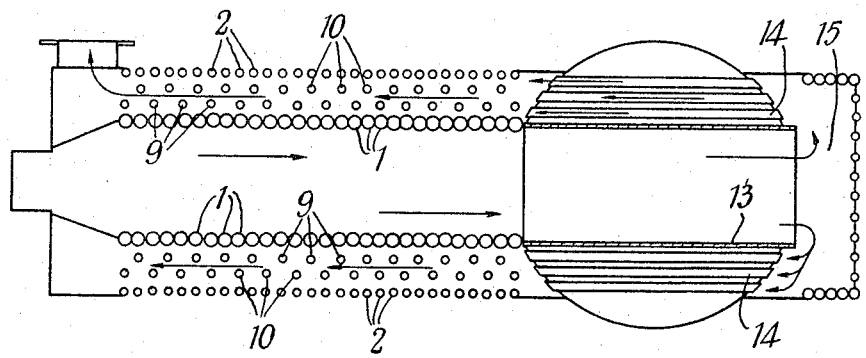
FIG. 5 is a diagrammatic vertical section of an alternative form of boiler incorporating a drum in which a combustion tube passes through the drum.

In the form of boiler, shown in FIG. 5, having a combustion tube 13 and a number of return fire tubes 14 passing through the sides of a drum, the inner cylindrical gas flow path of a water wall section within the circular tubes 1 connects with the combustion tube 13 and the return fire tubes connect with the outer annular flow path of the water wall section between the tubes 1 and 2. A water walled or refractory lined chamber 15 is provided from which the gas flowing from the combustion tube flows through the fire tubes.

Figure 6:
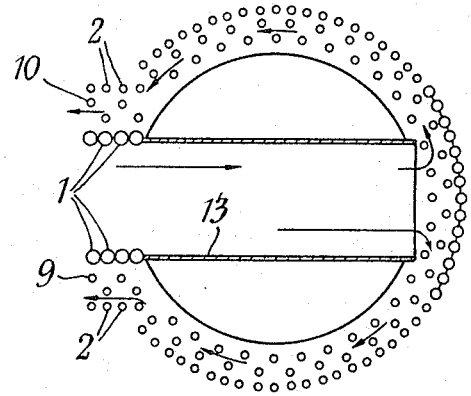
FIG. 6 is a diagrammatic horizontal section of an alternative type of boiler incorporating a vertical drum in which a combustion tube passes through the drum.

In another form shown in FIG. 6 fire tubes 14 are omitted and gas leaving the combustion tube is led through a water wall circumscribing the greater part of the drum circumference to pass through the outer annular flow path of a water wall section.

It is envisaged that the water tube units made in different standard sizes, may be put together in appropriate numbers to provide boilers of any of the above described forms with widely differing water wall heating surfaces.

It will be understood that the invention is not restricted to the details of the specific embodiment described which may be varied without departing from the scope of the following claims.

We claim:
1. A boiler assembly comprising, in combination,
a plurality of water tube units; each unit including an inner tubular ring; an outer tubular ring; an inlet tube having an outer end, an inner end connected to said inner ring, and being connected in an intermediate portion to said outer ring to position said rings in substantially concentric relation; an outlet tube having an outer end, an inner end connected to said inner ring oppositely from the inlet tube connection thereto, and an intermediate portion connected to said outer ring,
an inlet header connected to the outer ends of said inlet tubes and an outlet header connected to the outer ends of said outlet tubes to position said units in closely spaced parallel relation whereby the inner rings form a hot gas inflow path with the annular space between the inner and outer rings forming a hot gas return path.

2. The boiler assembly as defined in claim 1 including a pair of intermediate tubes joining the inlet and outlet tubes of each unit in the space between the inner and outer rings, one of said intermediate tubes lying in closely spaced relation to one side of said inner ring and the other of said intermediate tubes lying in closely spaced relation to the outer ring on the other side of said inner ring so that said intermediate tubes are radially staggered in said hot gas return path.

3. The boiler assembly according to claim 2 including a drum having inlet and outlet conduits leading to said inlet and outlet headers respectively.

4. The boiler assembly according to claim 3 wherein said drum includes a combustion tube forming an extension of said hot gas inflow path.

5. The boiler assembly according to claim 4 wherein said drum also includes fire tubes forming an extension of said hot gas return path.

6. The boiler assembly according to claim 4 wherein some of said units encompass said drum.

7. A boiler assembly comprising, in combination,
an elongate inlet header and an elongate outlet header disposed in spaced, parallel relation,
a plurality of water tube units joining said headers and positioned thereby to define a hot gas inflow path and a hot gas return path; each unit comprising an inlet tube connected at one end to said inlet header and an outlet tube connected at one end to said outlet header with such tubes extending axially toward each other but terminating in spaced apart inner ends, an inner tube ring connecting said inner ends, and an outer tube ring concentrically disposed with respect to the inner ring and connecting intermediate portions of said inlet and outlet tubes,
said inlet and outlet tubes and said inner and outer rings of each unit being disposed in a common plane, and said units being disposed in closely spaced parallel relation.

8. The boiler assembly as defined in claim 7 including a pair of intermediate tubes joining the inlet and outlet tubes of each unit in the space between the inner and outer rings, one of said intermediate tubes lying in closely spaced relation to one side of said inner ring and the other of said intermediate tubes lying in closely spaced relation to the outer ring on the other side of said inner ring so that said intermediate tubes are radially staggered in said hot gas return path.

References Cited

UNITED STATES PATENTS

| | | | |
|---|---|---|---|
| 3,107,656 | 10/1963 | McNeal | 122—236 |
| 3,257,992 | 6/1966 | Bishop | 122—328 |

FOREIGN PATENTS

| | | |
|---|---|---|
| 434,092 | 9/1926 | Germany. |

KENNETH W. SPRAGUE, *Primary Examiner.*